United States Patent [19]

Goel

[11] Patent Number: 4,705,838

[45] Date of Patent: Nov. 10, 1987

[54] ACCELERATION OF RATE OF CURE IN BORON TRIFLUORIDE AMINE CATALYZED CURE OF EPOXY RESINS

[75] Inventor: Anil B. Goel, Worthington, Ohio

[73] Assignee: Ashland Oil, Inc., Ashland, Ky.

[21] Appl. No.: 882,331

[22] Filed: Jul. 7, 1986

[51] Int. Cl.[4] .............................................. C08G 18/00
[52] U.S. Cl. ...................................... 528/48; 525/507;
525/528; 528/73; 528/91; 528/408
[58] Field of Search ...................... 528/48, 73, 91, 408;
525/507, 528

[56] References Cited

U.S. PATENT DOCUMENTS 4,613,660  9/1986  Goel et al. ............................ 528/73

Primary Examiner—Maurice J. Welsh
Attorney, Agent, or Firm—John F. Jones

[57] ABSTRACT

The process for acceleration of the cure rate of an epoxy resin which comprises forming a mixture of an epoxy resin, a boron trifluoride-amine complex and an isocyanate compound and curing said mixture at a temperature in the range of from about ambient to about 130° C. is described.

19 Claims, No Drawings

ACCELERATION OF RATE OF CURE IN BORON TRIFLUORIDE AMINE CATALYZED CURE OF EPOXY RESINS

The present invention relates to a process for the acceleration of the rate of cure of epoxy resins wherein a boron trifluoride-amine complex is used as the curing agent and small amounts of isocyanates are used as the accelerator.

The use of cationic catalysts such as boron trifluoride and boron trifluoride-amine complexes have been known to function as curing for epoxy resins. Boron trifluoride is seldom used, per se, for this purpose because of difficulties in handling and rapid gelation of the epoxy resins with excessive exotherms which usually result. On the other hand, boron trifluoride-amine complexes serve as catalysts for epoxy resins and they cause cure to take place at a very slow rate and moderately elevated temperatures and generally require high temperatures (greater than 140° C.) which is not practical in many applications.

A number of cationic catalysts are known in the prior art as curing agents for epoxy resins ["Epoxy Resins" Chemistry and Technology, edited by C. A. May and Y. Tanaka, 293 (1973)]. The most commonly used cationic catalyst is believed to be boron trifluoride; however, because of difficulties in handling and rapid gelation of epoxy resins with excessive exotherm, boron trifluoride alone is generally not used but rather is is used as a complex and usually as an amine complex. Of the variety of available boron trifluoride complexes, the boron trifluoride-amine complexes wherein the amine is a primary aliphatic or aromatic amine, conforming to the formula $BF_3$—$RNH_2$ wherein R represents an alkyl group having from 1 to 18 carbon atoms or an aromatic hydrocarbon group having from 6 to 12 carbon atoms or an alkaryl group having from 7 to 20 carbon atoms is most commonly used as a cationic catalyst. It is well known in the art that most of the boron trifluoride-amine catalysts exhibit a very slow rate of curing of epoxy resins at low-to-moderately elevated temperatures (less than 110° C.) and generally require much higher reaction temperatures (greater than 140° C.) for reasonably short curing rates. This high temperature curing requirement limits the use of the boron trifluoride-amine complexes. U.S. Pat. No. 2,909,494 describes the use of boron trifluoride-amine catalysts as accelerators for the curing of epoxy resins with amines as curing agents. The use of isocyanates as accelerators for the boron trifluoride-amine complex curing of epoxy resins has not previously been reported.

I have discovered that epoxy resins can be cured in mixtures with boron trifluoride-amine catalysts at a much improved rate at a temperature in the range of from about ambient to about 130° C. by including a small amount of a polyisocyanate in the curing mixture.

The epoxy resins (poly epoxides) useful in this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

Typical epoxy resins suitable in the practice of this invention include those disclosed in U.S. Pat. Nos. 2,500,600 and 2,324,438 which are incorporated herein by reference. Preferred in this invention are 1,2-epoxy compounds having an epoxide equivalence greater than 1, that is to say, compounds containing more than one group of the formula:

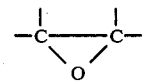

The 1,2-epoxide groups may be either terminal or inner ones. Particularly suitable terminal 1,2-epoxide groups are 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexane diepoxide, epoxidized diolefinically unsaturated carboxylic acid esters, such as methyl-9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters and mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The polyisocyanates useful in this invention include organic isocyanates having at least two isocyanate groups per molecule. The polyisocyanates can be of low, high or intermediate molecular weight and can be of any wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,3-diisocyanate, 1,4-diisocyanato cyclohexane, cyclopentane-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanate butane, butane-1,2,3-triisocyanate, polymethylene polyphenyl isocyanate, and other polymethylene polyphenyl isocyanates, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

Because polyepoxide resins containing small amounts (0.05 to about 10% by weight) of boron trifluoride-amine catalysts are stable and remain ungelled for long periods of time at ambient temperatures (more than 1 month), it is convenient to mix the polyepoxide and boron trifluoride-amine complex and keep it as a separate component of a two-component system for curing purposes. The second component is composed of the polyisocyanate as the essential component. The epoxide resin component may contain other materials such as polymers including polybutadiene rubber for instance, for improving the flexibility of the cured polymer. Fillers, pigments and dyes can also be present in the polyepoxide component. It is also possible to use the present process in the form of a single component by encapsulating either the boron trifluoride-amine catalyst or the polyisocyanate in a low melting encapsulating material and mixing all components from the outset. In such a single component system, upon heating, the encapsulated material becomes free as the encapsulating material melts and a rapid curing system results. Another less preferable approach to the single component system is to use the polyisocyanate in the form of its carbamate which will decompose with heat in the single component mixture to yield the polyisocyanate which then accelerates the cure of the epoxy resin/boron trifluoride-amine catalyst reaction.

The optional use of various types of diluents such as monoepoxy resins, triphenyl phosphite, flexibilizers and fillers such as talc, aluminum oxide, fumed silica, metal powders, etc. in one or both components is within the scope of this invention. The cured compositions which result from the curing of the polyepoxide/borontrifluoride-amine/polyisocyanate mixtures of this invention may be used in applications such as adhesives, coatings, reinforced composites and the like.

This invention is further illustrated in the following representative examples.

EXAMPLE 1

This is presented for comparison purposes and is outside the scope of the present invention. A solution of 10 g of the liquid diglycidyl ether of Bisphenol-A (epoxy equivalent weight of 180–195) and 0.3 g of boron trifluoride-ethyl amine complex was heated at 100° C. for one hour. The material was initially and remained a viscous liquid indicating little or no curing of the epoxide resin.

EXAMPLE 2

The procedure of Example 1 was followed. To a solution of 10 g of liquid diglycidyl ether of Bisphenol-A and 0.3 g of the boron trifluoride-ethyl amine complex was added 0.5 g of liquid methylene bis(phenyl isocyanate) and the reaction solution was heated at 100° C. A rapid polymerization occurred within 1.5 minutes to give a solid polymer.

EXAMPLE 3

To a solution of 10 g of the liquid diglycidyl ether of Bisphenol-A and 0.3 g of boron trifluoride-ethyl amine complex was added 0.4 g of toluene diisocyanate and the reaction mixture was heated at 100° C. An extremely exothermic reaction occurred to give a solid gelled polymer within 1.5 minutes.

EXAMPLE 4

A mixture of 7 g of liquid diglycidyl ether of Bisphenol-A, 3 g of the diglycidyl ether of poly(propylene glycol) (epoxy equivalent weight of 305–335), 0.3 g of boron trifluoride-ethyl amine complex catalyst and 0.4 g of toluene diisocyanate was heated at 105° C. A rapid polymerization occurred within one minute to give a solid polymeric material.

EXAMPLE 5

A solution of 10 g of the liquid diglycidyl ether of Bisphenol-A, 5 g of the diglycidyl ether of poly(propylene glycol) of Example 4, 0.5 g of boron trifluoride-$C_6H_5CH_2NH_2$ and 0.6 g of liquid methylene bis(phenyl isocyanate) was heated at 105° C. A rapid polymerization occurred within 1.5 minutes to give a solid polymer.

EXAMPLE 6

A solution of 60 g of the liquid glycidyl ether of Bisphenol-A, 10 g of the diglycidyl ether of poly(propylene glycol) of Example 4, 5 g of phenyl glycidyl ether, and 3 g of boron trifluoride-ethyl amine catalyst was filled with 25 g of dry talc filler. A part (10 g) of this epoxy resin component was mixed with an isocyanate prepolymer (3 g) obtained by the reaction of liquid methylene bis(phenyl isocyanate) (33 parts) with ethylene oxide capped poly (propylene glycol) (hydroxyl equivalent weight of 1000) (100 parts) and filled with 15 parts of dry talc and the mixture was heated at 110° C. Gelation occurred within two minutes to give a solid polymer.

EXAMPLE 7

An epoxy resin was prepared by reacting 90 g of the liquid diglycidyl ether of Bisphenol-A with 10 g of polybutadiene/acrylonitrile (18% acrylonitrile) Hycar rubber (BF Goodrich Company). The resulting mixture was mixed with 10 g of the diglycidyl ether of poly (propylene glycol) of Example 4, 5 g of phenyl glycidyl ether and 4 g of boron trifluoride-ethyl amine and the resulting liquid was filled with 30 g of dry talc. A part (20 g) of this was mixed with 6 g of the isocyanate prepolymer described in Example 6. The resulting viscous pasty material was applied between two 10 inch by 4 inch by 100 mil fiberglass reinforced polyester plastic sheets made of sheet molding compound (SMC) with a one inch wide overlap. The bond thickness between the sheets was controlled by placing 30 mils diameter glass beads between the sheets in the epoxy resin adhesive mixture before curing. The adhesive sample was then cured by heating in a heater fixture at 230° F. under 1 psi pressure for five minutes followed by post curing in an oven at 285° F. for 30 minutes. Lap shear test specimens were cut from the laminated sheets into one-inch wide strips. Lap shear was determined to be in the range of from 350–600 psi on an Instron instrument.

I claim:

1. The process for the acceleration of the cure rate of an epoxy resin comprising forming a mixture of an epoxy resin with a boron trifluoride-amine complex and an isocyanate compound and curing said mixture at a temperature in the range of from about ambient to about 130° C.

2. The process of claim 1 wherein the boron trifluoride-amine complex is a compound of the formula $BF_3—RNH_2$ wherein R represents an alkyl group having from 1 to 18 carbon atoms or an aromatic hydrocarbon group having from 6 to 12 carbon atoms or an alkaryl group having from 7 to 20 carbon atoms.

3. The process of claim 2 wherein the epoxy resin is a compound containing more than one group of the formula

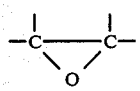

4. The process of claim 3 wherein the isocyanate is a polyisocyanate having at least two isocyanate groups per molecule.

5. The process of claim 4 wherein the boron trifluoride-amine complex is present in from about 0.05 to about 10% by weight based on the weight of the epoxy resin.

6. The process of claim 5 wherein the boron trifluoride-amine complex is boron trifluoride-ethyl amine.

7. The process of claim 5 wherein the boron trifluoride-amine complex is boron trifluoride-benzyl amine.

8. The process of claim 6 wherein the epoxy resin is the diglycidyl ether of Bisphenol-A and the polyisocyanate is methylene bis(phenyl isocyanate).

9. The process of claim 6 wherein the epoxy resin is the diglycidyl ether of Bisphenol-A and the polyisocyanate is toluene diisocyanate.

10. The process of claim 6 wherein the epoxy resin is a mixture of the diglycidyl ether of Bisphenol-A and the diglycidyl ether of poly(propylene glycol) and the polyisocyanate is toluene diisocyanate.

11. The process of Example 7 wherein the epoxy resin is a mixture of the diglycidyl ether of Bisphenol-A and the diglycidyl ether of poly(propylene glycol) and the polyisocyanate is methylene bis-(phenyl isocyanate).

12. The process of claim 6 wherein the epoxy resin is a mixture of the diglycidyl ether of Bisphenol-A, the diglycidyl ether of poly(propylene glycol) and phenyl glycidyl ether and the polyisocyanate is an isocyanate prepolymer obtained by the reaction of methylene bis(phenyl isocyanate) with an ethylene oxide capped poly(propylene glycol).

13. An adhesive composition comprising a mixture of an epoxy resin, a boron trifluoride-amine complex and an isocyanate compound.

14. The composition of claim 13 wherein the boron trifluoride-amine complex is a compound of the formula $BF_3$—$RNH_2$ wherein R represents an alkyl group having from 1 to 18 carbon atoms or an aromatic hydrocarbon group having from 6 to 12 carbon atoms or an alkaryl group having from 7 to 20 carbon atoms.

15. The composition of claim 14 wherein the epoxy resin is a compound containing more than one group of the formula

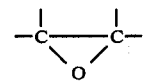

16. The composition of claim 15 wherein the isocyanate is a polyisocyanate having at least two isocyanate groups per molecule.

17. The composition of claim 16 wherein the boron trifluoride-amine complex is present in from about 0.05 to about 10% by weight based on the weight of the epoxy resin.

18. The composition of claim 17 wherein the boron trifluoride-amine complex is boron trifluoride-ethyl amine.

19. The composition of claim 17 wherein the boron trifluoride-amine complex is boron trifluoride-benzyl amine.

* * * * *